July 23, 1940.  R. N. JANEWAY  2,208,634
VEHICLE DRAFT MEANS
Filed Feb. 8, 1937  2 Sheets-Sheet 1

INVENTOR
ROBERT N. JANEWAY.
BY
Harness, Dind, Pater & Harris
ATTORNEY

INVENTOR
ROBERT N. JANEWAY.
BY
Harness, Lind, Pater & Harris
ATTORNEYS.

Patented July 23, 1940

2,208,634

UNITED STATES PATENT OFFICE 2,208,634

VEHICLE DRAFT MEANS

Robert N. Janeway, Detroit, Mich., assignor to Chrysler Corporation, Highland Park, Mich., a corporation of Delaware Application February 8, 1937, Serial No. 124,558

5 Claims. (Cl. 213—12)

My invention relates to railway vehicle equipment and it has particular relation to an improved type of draft means therefor.

My invention is particularly directed to the type of vehicle interconnecting means in which an interconnecting means located adjacent the ends of the vehicle body causes the forces transmitted thereby to have an effective center of application at any predetermined point within the vehicle, even though that point be materially removed from the point of attachment of the interconnecting means to the vehicle.

The object of my invention consists in providing a novel type of vehicle interconnecting means of the character indicated in which the interconnecting means serves to cushion any forces transmitted thereby, regardless of whether such forces are compressive or tensional in nature.

For a better understanding of my invention reference may now be had to the accompanying drawing, in which.

Figure 1:
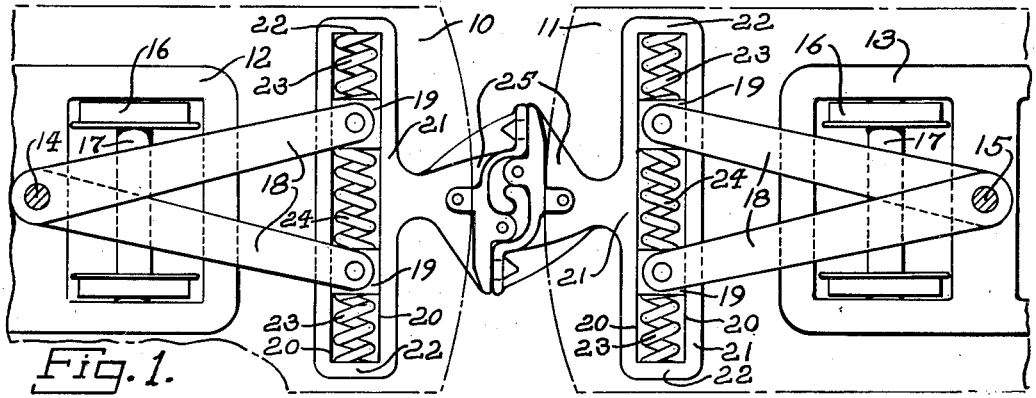
Fig. 1 is a view, partially in plan and partially in section, illustrating the adjacent ends of two railway vehicles connected together by draft means embodying one form of my invention.
Figure 2:
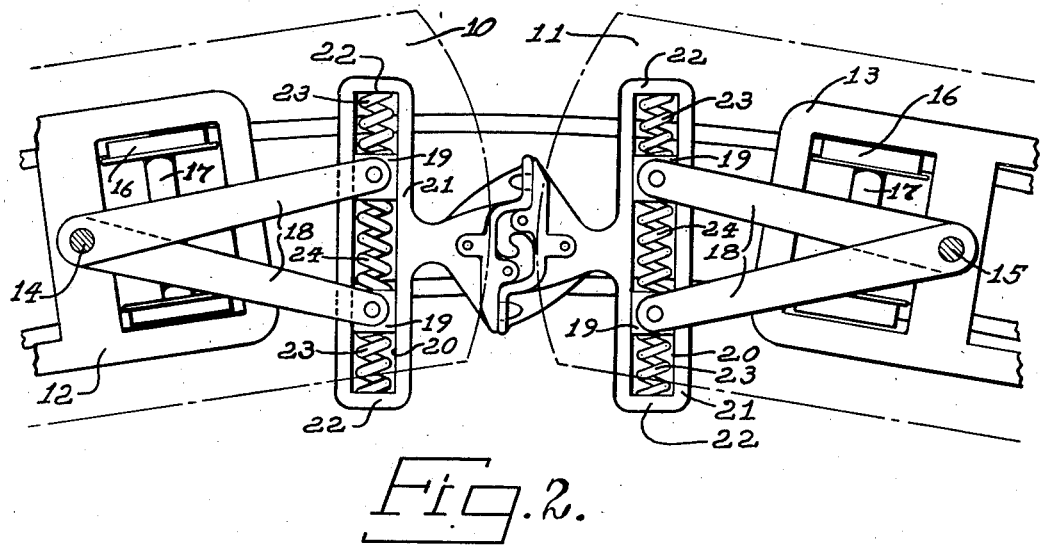
Fig. 2 is a view of the structure illustrated in Fig. 1 showing one of the positions occupied by my draft means while the vehicles which it interconnects are passing around a curve in the railroad track.
Figure 3:
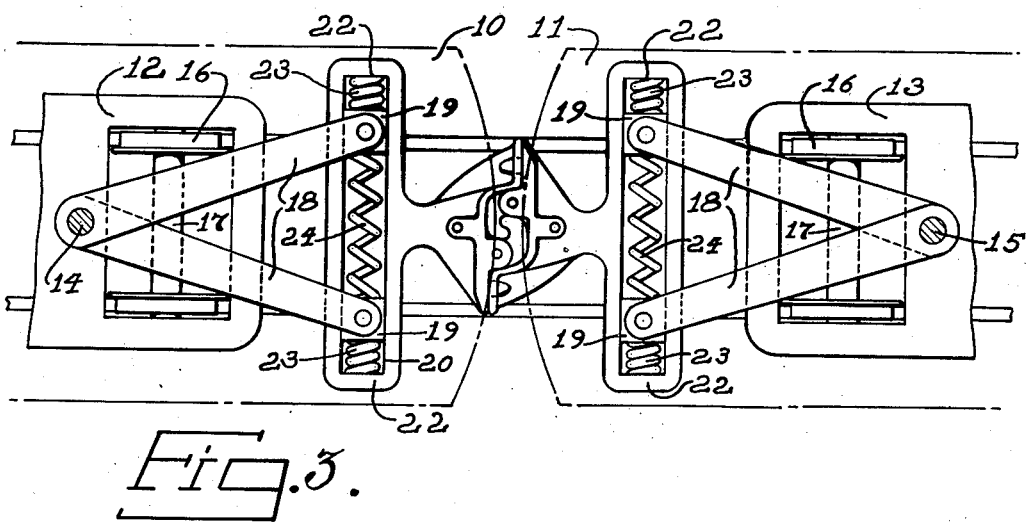
Fig. 3 is a view of the structure shown in Fig. 1, illustrating the positions occupied by the various parts of my draft means at a moment of impact between the two railroad vehicles.

In the structure illustrated I have shown diagrammatically two car bodies 10 and 11, provided with associated supporting trucks 12 and 13 respectively and with king pins or center bearings 14 and 15, respectively, about which the trucks turn with respect to the car bodies. Each truck is, of course, provided with the usual wheels 16 and axles 17.

Pivotally mounted on the center bearing 14 are two diverging arms 18, the opposite ends of which are pivotally secured to spaced blocks 19 adapted to slide laterally of the car 10 in guides 20. The blocks 19 may, if desired, be provided with rollers, or other friction reducing means, adapted to engage the guides 20 and permit them to move freely thereon. The guides 20 constitute part of a frame 21 having closed ends 22 between which and the slidable blocks 19 are disposed compression springs 23. A third compression spring 24 serves to resiliently maintain the blocks 19 in spaced relationship. Integral with or suitably secured to the frame 21 is a coupling 25 of the usual type which permits no pivotal movement between the two drawbars interconnected thereby, and the details of which constitute no part of the present invention.

The car 11 is provided with an identical set of parts which have been marked with the same reference numerals.

From the foregoing description it will be apparent that when the cars 10 and 11 are operating on a straight track the draft means, being mounted on the center bearings 14 and 15, will occupy a position centrally of the cars, in a lateral direction, and will adjust themselves with respect to the center bearings 14 and 15, and that when the cars are rounding a curve in the track, the draft means will still adjust themselves with respect to their centers of support, the center bearings 14 and 15, so that regardless of the relative angularity of the two car bodies, a line drawn between the two center bearings 14 and 15, will always pass through the center of the draft or interconnecting means. It will also be apparent that the centers 14 and 15, may, if desired, be moved to some points removed from the centers of suspension or centers of oscillation of the trucks 10 and 11, and that the draft means will always tend to center itself laterally with respect to the new centers of the arms 18.

When any tensional forces are exerted by the car 10 on the car 11 a tension is placed on the links 18 by the pin 14. The tension on the links 18 causes their opposite ends, and the associated slidable blocks 19, to move towards each other, compressing the spring 24, and then exerting a tension on the frame 21 and coupling member 25. The tension on the coupling member 25 associated with car 11 likewise, and in a similar manner though reversed in order, causes compression of its associated spring 24 before that tension is transmitted by its links 18 to the supporting pin 15. It is thus apparent that each of the springs 24 must be compressed before the tension forces exerted by car 10 are applied to car 11 and that the springs 24 serve to cushion any such tensional forces between the two cars.

In like manner any compressive forces exerted by car 10 on car 11 place the links 18 under compression, causing the opposite ends thereof, with their associated slidable blocks 19, to move apart, thus placing the spring 23 under compression, and then exerting a compressive force on the frame 21 and coupling 25. Accordingly, the springs 23 of the car 11 must also be placed under compression before any compressive forces exerted by car 10 through pin 14 can reach car 11 through pin 15.

Although I have illustrated but one form of my invention and have described but one application thereof it will be apparent to those skilled in the art that it is not so limited but that various modifications and changes may be made therein without departing from the spirit of my invention or the scope of the appended claims.

What I claim is:

1. Vehicle draft means comprising arms pivotally secured at one end to a vehicle, a guide member provided with a vehicle coupling device and operatively associated with the opposite ends of said arms, and resilient means operatively associated with said guide member and the opposite ends of said arms and adapted to restrain relative movement of said opposite ends of the arms.

2. Vehicle draft means comprising a guide member adapted to be disposed transversely of a vehicle, a coupling device secured to said guide member, two arms adapted to be pivotally secured to a vehicle at one end and relatively movably secured to said guide member at the opposite ends, and spring members associated with said guide member and the opposite ends of said arms and adapted to resiliently restrain movement of said arm ends towards or away from each other.

3. In combination, a railway car comprising a car body mounted on two spaced pivoted trucks, and draft means at one end of said car comprising two arms both pivoted on the pivotal axis of the adjacent truck and diverging towards the adjacent end of the car, a guide member pivotally slidably secured to the diverging ends of both arms, spring means interconnecting said diverging arms, and a car coupling member secured to said guide means.

4. In combination, a railway car comprising a car body mounted on two spaced pivoted trucks, and draft means at one end of said car comprising two arms both pivoted on the pivotal axis of the adjacent truck and diverging towards the adjacent end of the car, a slidable member pivotally secured to each arm adjacent the diverging end thereof, a transversely extending guide member enclosing said slidable members and slidable with respect thereto, springs enclosed within said guide member between said slidable members and between said slidable members and the ends of said guide member, and a coupling member rigidly mounted on said guide member.

5. Draft means for a rail vehicle comprising two arms having a common pivotal axis in said vehicle at a point removed from one end thereof, said arms extending from said axis toward said vehicle end in diverging relationship with respect to one another, draft-force transmitting means operably connected to the diverged ends of said arms to accommodate movement of said diverged arm ends toward and away from each other relative to said draft-force transmitting means when the vehicle is travelling on a straight track, shock cushioning means acting on said diverged arm ends to yieldingly oppose their relative movement in opposite directions, and car coupling means carried by said draft-force transmitting means.

ROBERT N. JANEWAY.